United States Patent [19]

Levens

[11] Patent Number: 5,780,721
[45] Date of Patent: Jul. 14, 1998

[54] COMPOSITE CONSTRUCTION FOR DETECTION CHEMICAL LEAKS

[75] Inventor: Dennis L. Levens, Hudson, Wis.

[73] Assignee: Minnesota Mining and Manufacturing Company, St. Paul, Minn.

[21] Appl. No.: 659,032

[22] Filed: Jun. 3, 1996

[51] Int. Cl.$^6$ ............................................. G01M 3/04
[52] U.S. Cl. ............................................. 73/40; 422/56
[58] Field of Search .................. 422/56; 436/169; 604/361; 116/206; 73/40

[56] References Cited

U.S. PATENT DOCUMENTS

| | | | |
|---|---|---|---|
| 2,214,354 | 9/1940 | Snelling | 116/114 |
| 2,249,867 | 7/1941 | Snelling | 73/335 |
| 3,675,654 | 7/1972 | Baker et al. | 604/361 |
| 3,759,261 | 9/1973 | Wang | 604/361 |
| 3,918,454 | 11/1975 | Korodi et al. | 128/287 |
| 4,192,311 | 3/1980 | Felfoldi | 604/361 |
| 4,231,370 | 11/1980 | Mroz et al. | 604/361 |
| 4,258,000 | 3/1981 | Obermayer | 422/55 |
| 4,269,793 | 5/1981 | Ibbott | 261/65 |
| 4,382,380 | 5/1983 | Martin | 73/73 |
| 4,705,513 | 11/1987 | Sheldon et al. | 604/361 |
| 4,738,674 | 4/1988 | Todd et al. | 604/361 |
| 4,745,797 | 5/1988 | Wegrzyn | |
| 4,784,959 | 11/1988 | Wegrzyn | |
| 4,863,694 | 9/1989 | Kimmel et al. | 422/86 |
| 4,920,342 | 4/1990 | Gratke | 341/22 |
| 4,987,849 | 1/1991 | Sherman | 116/206 |
| 5,120,137 | 6/1992 | Ou-Yang | |
| 5,551,184 | 9/1996 | Grosse | 43/25 |

FOREIGN PATENT DOCUMENTS

| | | |
|---|---|---|
| 2710751 | 4/1995 | France . |
| 25 52 508 | 5/1977 | Germany . |
| 28 54 016 | 7/1980 | Germany . |
| 61097547-A | 6/1986 | Japan . |
| 64-88129 | 4/1989 | Japan . |
| 01088129-A | 2/1990 | Japan . |

OTHER PUBLICATIONS

Dragerwerk Aktiengesellschaft Lubeck, Drager–Rohrchen 81 01 631 Apr. 7, 1997.

*Primary Examiner*—Hezron E. Williams
*Assistant Examiner*—Jay L. Politzer
*Attorney, Agent, or Firm*—Steven E. Skolnick

[57] ABSTRACT

The present invention relates to composite constructions useful for detecting chemical leaks and methods of using the same. The composite constructions comprise materials that deteriorate in the presence of the chemicals to be detected, thereby exposing a visual indicator that signals that a leak has occurred.

23 Claims, 4 Drawing Sheets

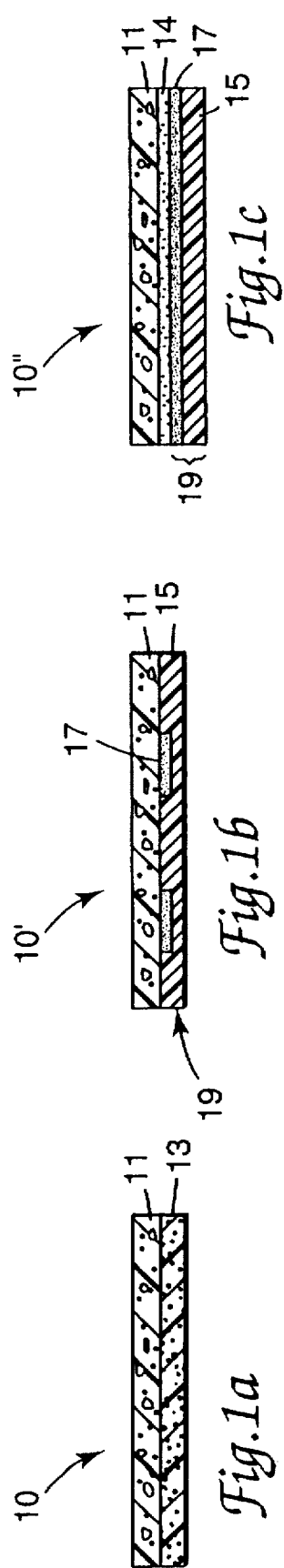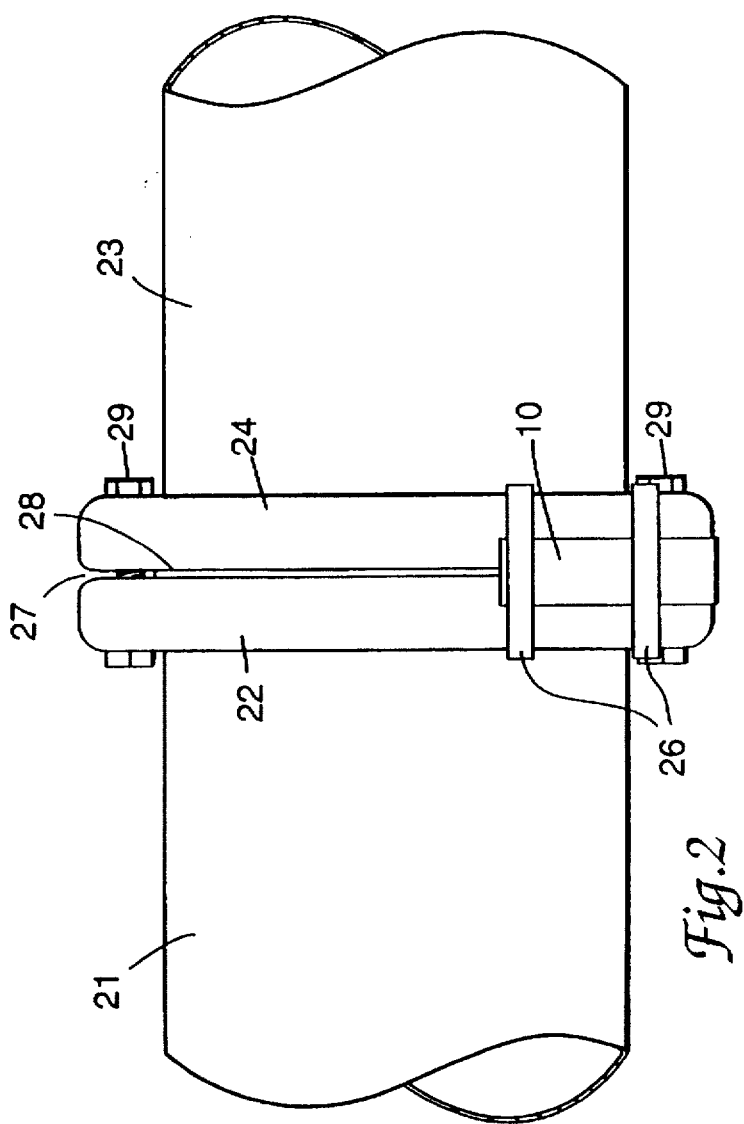

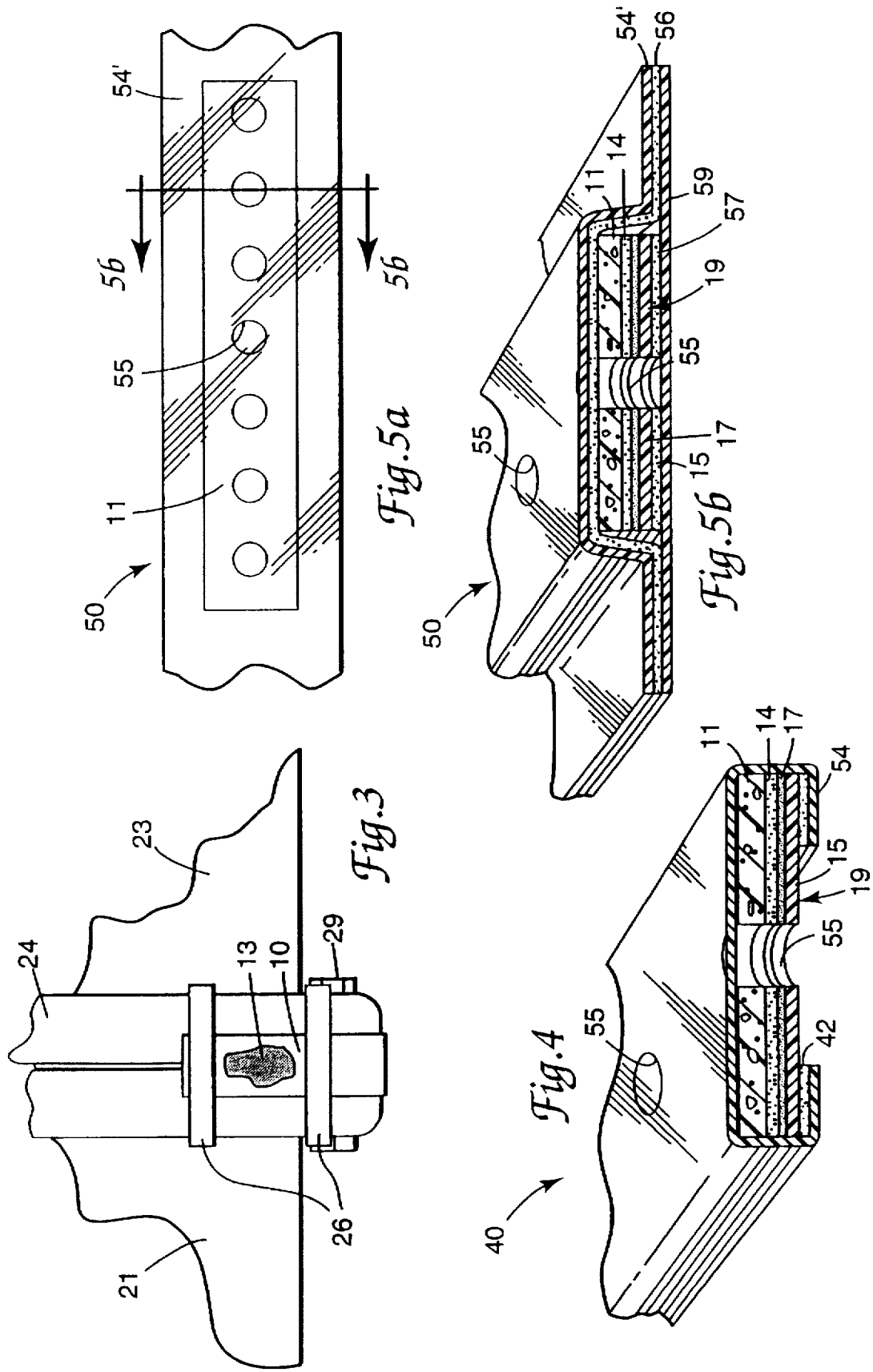

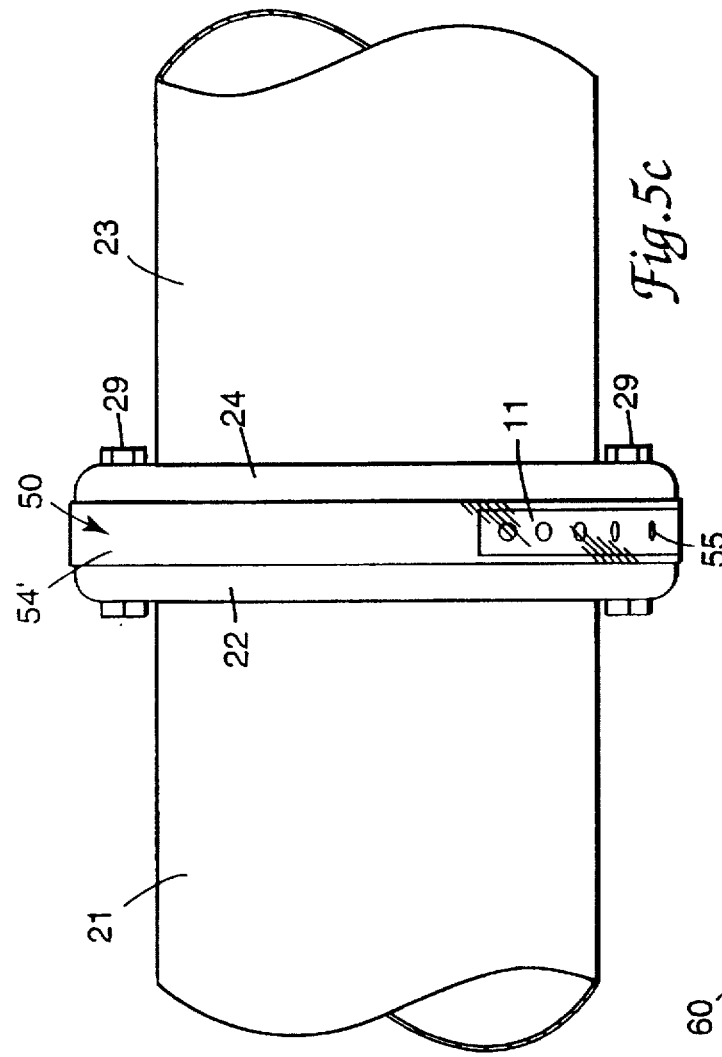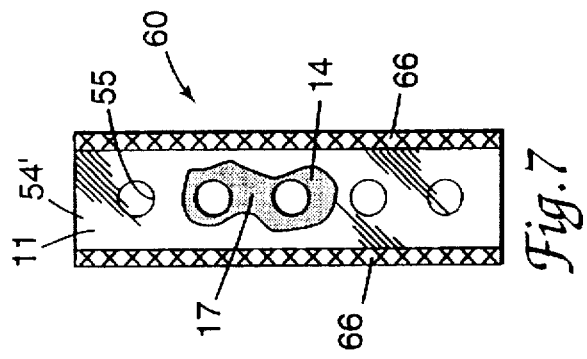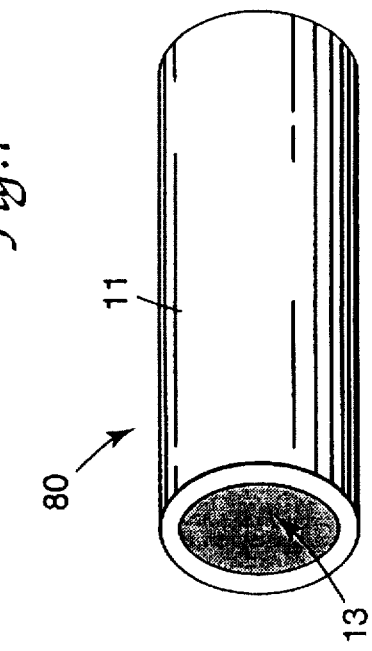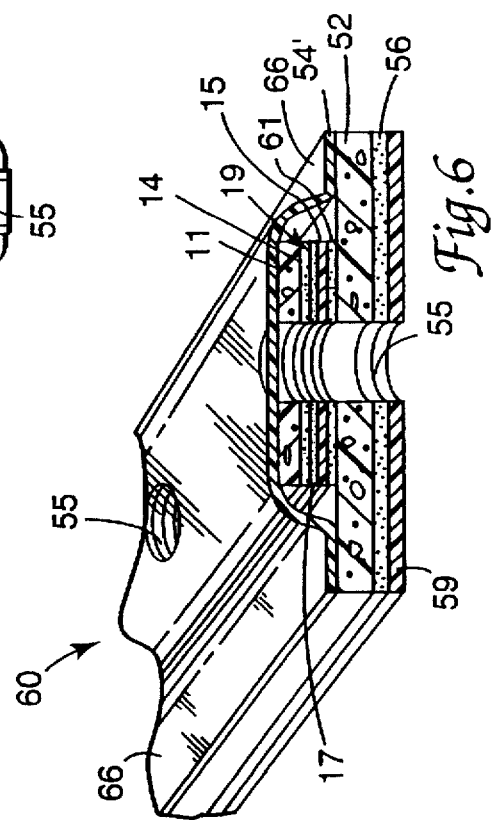

COMPOSITE CONSTRUCTION FOR DETECTION CHEMICAL LEAKS

FIELD OF THE INVENTION

The present invention relates to composite constructions useful for detecting chemical leaks and methods of using the same. The composite constructions employ a material that becomes transparent in the presence of the chemical(s) to be detected to expose a visual indicator that signals that a leak has occurred.

BACKGROUND OF THE INVENTION

Chemical leak detection is a critical issue for chemical plants and refineries, especially when toxic and hazardous chemicals are involved. For certain chemicals, environmental regulations mandate inspection procedures to ensure that chemical leaks are identified and remedied. This in turn ensures a safe work environment for employees of such industries and prevents environmental contamination.

Chemical leaks are especially prone to occur at the location where two pipes are joined together. A common way to form such joints is by mating two flanged pipes, typically using a gasket between the flanges to provide a good seal, and mechanically attaching the flanges together, for example, using bolts that extend through each of the flanges. When a leak occurs, a variety of corrective measures can be taken, for example, tightening bolts, replacing gaskets, or applying sealant to stop the leak.

A common way to test for leaks at such joints is by using a hand-held vapor analyzer or "sniffer". Such devices typically use a probe to draw in an air sample at the desired test point. The air sample is then analyzed by the device to determine the concentration of vapors present.

An example of one commercially available vapor analyzer is the TVA 1000 Analyzer, sold by the Foxboro Company. The TVA 1000 Analyzer comprises a two-part design, one part being a sidepack carried on a rugged shoulder strap and the other part being a hand-held probe unit connected to the sidepack by a flexible hose. The side-pack contains the detector modules, battery and fuel supplies, a microprocessor, a liquid crystal display (LCD) panel, a keypad and controls for sampling and fueling. The probe unit contains the sample intake system, field display LCD, and field and sampling datalogging controls. The literature for the TVA 1000 reports that its measurement range covers from 0.5 to 50,000 ppm and that it can detect a variety of organic and inorganic vapors.

While such vapor analyzers have proven useful, they have certain disadvantages. For example, oftentimes the test site is not readily accessible, and the operator of the analyzer must carry it up a ladder or over a complex piece of process equipment to reach the test site. This is potentially hazardous to the operator who might slip and fall or otherwise harm himself or herself attempting to reach the test site.

Another disadvantage associated with the use of vapor analyzers is that they do not provide continuous monitoring of a test point and therefore must be used repeatedly to ascertain whether leakage is occurring. In some instances, testing may be performed at certain intervals, for example, once every three months or once a year. A leak can occur anytime during this interval without being detected until the next scheduled check. Furthermore, because vapor analyzers only detect leaks that are occurring at the time of the check, they cannot determine if intermittent leakage is occurring, such as may be caused by pressure changes in the chemical system.

Further disadvantages are that vapor analyzers require a certain amount of skill to operate and must be calibrated and maintained for performance. The costs of using vapor analyzers (including operator time, analyzer maintenance and calibration costs, and costs associated with the maintenance of records) tend to be high, especially for chemical plants and refineries having several hundred to several thousand pipe joints to test.

While the use of vapor analyzers is quite common in the chemical industry, other methods for detecting fugitive chemical emissions are known. In general, these other methods rely on a chemical reaction between the fugitive chemical and another compound which causes a color change.

For example, Drägerwerk Aktiengesellschaft Lübeck sells a variety of Dräger tubes which may be used to detect the presence of certain chemicals. For example, Dräger Tube 81 01 631 is reportedly useful for detecting the presence of alcohols such as methanol, ethanol, i-propanol, and butanol in air and other gases. The tube contains two layers, a white pre-layer and a brown indicating layer. According to product literature, when air or gas is drawn through the tube, the atmospheric humidity is retained in the pre-layer, and the indicating layer changes color to brownish-black in the presence of alcohol. Other Dräger tubes are sold to detect other chemicals.

By way of another example, U.S. Pat. Nos. 4,745,797 and 4,784,959 (Wegrzyn) describe a method of detecting fuel leaks in a fuel tank using color variable indicators. The method comprises the steps of introducing fuel into a fuel tank, applying a water soluble non-staining indicator dye to the surface of the tank, checking for any color changes in the indicator dye which indicate hydrocarbon leakage, and removing the indicator dye from the test surface.

These methods of using color change to indicate leakage also have disadvantages. For example, they are limited in their use to the detection of only certain fugitive chemicals. For example, the Dräger Tube 81 01 631 only detects alcohols, and the method of Wegrzyn is specific to hydrocarbons. In addition, it is often difficult to determine whether the color change has occurred. For example, the literature for the Dräger Tube 81 01 631 reports a color change from brown to brownish-black. This color change may be difficult to observe. A further disadvantage with such color change methods is that they generally do not provide for continuous monitoring of test sites. For example, the Dräger Tube 81 01 631 provides for single point-in-time detection only.

Accordingly, a need exists for a simplified device which can be used to continuously monitor for the presence of chemical leaks. Preferably, such a device overcome the disadvantages associated with the use of vapor analyzers and color change indicators.

SUMMARY OF THE INVENTION

The present invention provides composite constructions useful for detecting chemical leaks and methods of using the same. The composite constructions comprise materials that become transparent in the presence of the chemical(s) to be detected, thereby exposing a pre-existing visual indicator that signals that a leak has occurred. The present invention does not rely upon a chemical reaction to create a color change. As a result, it is simple and effective.

More specifically, in one embodiment, the present invention provides a composite construction comprising a first layer and a second layer. The first layer comprises a visual indicator that signals that a chemical leak has occurred and may be referred to as a "visual indicating layer". The second layer conceals the visual indicator, but becomes transparent in the presence of a chemical to be detected to expose the visual indicator.

In another embodiment, the present invention provides a composite construction comprising an inner core and an outer shell. The inner core comprises a visual indicator. The outer shell surrounds and conceals the visual indicator. When the outer shell is exposed to the chemical(s) to be detected, the outer shell becomes transparent to expose the visual indicator of the inner core.

In still another embodiment, the present invention provides a composite construction comprising a visual indicating layer having first and second distal ends. The first distal end comprises a first attachment means, and the second distal end comprises a second attachment means. The second attachment means comprises a layer of a material that deteriorates in the presence of a chemical to be detected.

In still another embodiment, the present invention provides a method of detecting chemical leaks. The method comprises the steps of attaching a composite construction of the invention to an article to be tested for chemical leaks, and monitoring the composite construction for the appearance of the visual indicator.

The composite constructions and methods of the present invention may be used to provide continuous chemical leak monitoring of an article, such as, for example, a pipe joint, valve, or spigot. Because the monitoring is continuous, the composite constructions can detect leakage that is continuous or intermittent. Furthermore, the composite constructions can be viewed from a distance for the appearance of the visual indicator, thereby obviating the need to come into close contact with the article to be monitored. In addition, the composite constructions are easy to use, and a single composite construction can detect a wide variety of chemical compounds.

BRIEF DESCRIPTION OF THE DRAWINGS

The invention will be more fully appreciated with reference to the following drawings in which similar reference numerals designate like or analogous components and in which:

FIG. 1a is a cross-sectional view of a first embodiment of the present invention;

FIG. 1b is a cross-sectional view of a modification of the embodiment of FIG. 1a;

FIGS. 1c is a cross-sectional view of another modification of the embodiment of FIG. 1a;

FIG. 2 is a top plan view showing the embodiment of FIG. 1a attached to a pipe joint;

FIG. 3 is a view similar to FIG. 2 illustrating the appearance of the composite construction of FIG. 1a after a chemical leak has occurred, FIG. 4 is a cross-sectional perspective view of another embodiment of the present invention;

FIG. 5a is a top view of another embodiment of the present invention;

FIG. 5b is a cross-sectional perspective view taken along line 5b of FIG. 5a;

FIG. 5c is a view similar to FIG. 2 showing the embodiment of FIGS. 5a and 5b applied to a pipe joint;

FIG. 6 is a cross-sectional perspective view of another embodiment of the present invention;

FIG. 7 is a top plan view showing the embodiment of FIG. 6 after a chemical leak has occurred;

FIG. 8 is a perspective view of another embodiment of the present invention;

DETAILED DESCRIPTION OF THE INVENTION

Figure 9:
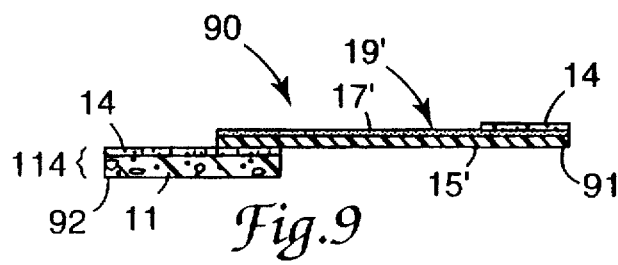
FIG. 9 is a cross-sectional end view of another embodiment of the present invention.

Turning now to the drawings, one embodiment of the composite construction of the present invention is shown in FIG. 1a. The term "composite construction" means an assembly of two or more layers of material. The composite construction 10 of FIG. 1a comprises a layer 11 that becomes transparent (for example, by dissolving, deteriorating, or by a change in refractive index) in the presence of a chemical to be detected. Layer 11 is selected by virtue of its ability to become transparent in the presence of the chemical(s) to be detected. Preferably, layer 11 comprises a closed cell foam. A particularly preferred closed cell foam comprises polystyrene because of its ability to become transparent in a wide variety of chemicals including acetone, methyl ethyl ketone, carbon disulfide, toluene, xylene, benzene, tetrahydrofuran, ethylacetate, ethyl benzene, dichloromethane, chloroform, styrene, and unleaded gasoline.

Other useful materials for layer 11 include styrene-isoprene-styrene (S-I-S) block copolymers (which becomes transparent in the presence of aromatic hydrocarbons), and ethyl or methyl cellulose, ethyl vinyl alcohol, polyvinyl alcohol, and gelatin (all of which become transparent in the presence of water). Typical thicknesses for layer 11 are in the range of from about 0.6 mm (24 mils) to 1.5 mm (60 mils). It is also possible to employ two or more different materials as layer 11 in one composite construction to provide the ability to detect an even greater range of chemicals. For example, one portion of layer 11 could be polystyrene foam while another portion could be a gelatin foam. This would enable the detection of water in addition to acetone, methyl ethyl ketone, carbon disulfide, toluene, xylene, benzene, tetrahydrofuran, ethylacetate, ethyl benzene, dichloromethane, chloroform, styrene, and unleaded gasoline.

Layer 11 masks or conceals layer 13. Layer 13 comprises a visual indicator that signals that a chemical leak has occurred and may be referred to as a "visual indicating layer". For example, layer 13 may comprise a colorant such as a layer of pigment or dye. The colorant may be provided separately or dispersed within a binder, an adhesive, or a polymeric matrix. Preferred colorants are pigments that provide bright colors (such as orange or red) that are easily visually observed.

Alternatively, the visual indicating layer may comprise a substrate bearing a colorant thereon. FIG. 1b illustrates a cross-sectional view of a composite construction 10' comprising visual indicating layer 19. Visual indicating layer 19 comprises a substrate 15 bearing visual indicator 17 in the form of graphics or other printed matter. FIG. 1c illustrates a cross-sectional view of a composite construction 10" wherein visual indicating layer 19 comprises a substrate 15 bearing a visual indicator 17 in the form of a continuous layer of colorant. The visual indicators 17 may be provided using a variety of techniques, including, for example, spray painting; plate printing processes such as letterpress or relief printing, lithography, gravure or intaglio printing, screen or stencil printing; or plateless printing processes such as thermal imaging, ink jet printing, and imaging techniques based on electrostatic, electrophotographic, or photoconductive technologies; or combinations thereof.

Preferably, the visual indicator is colorfast, i.e., does not bleed in the presence of the chemical(s) to be detected. The visual indicator may be provided on a wide variety of substrates 15 such as polymeric films (such as polyester, polyethylene, Teflon, polyvinylchloride, polystyrene, ethylene vinylacetate, ethylene methylacrylate, ethylene ethylacrylate, polycarbonate, polyurethane, polyacrylate, polyvinylidene chloride, and polypropylene), fabrics, paper, and metal films (such as aluminum foil). The substrate 15 may be provided as a scrim, foam, nonwoven, woven, microporous or microperforated material. Preferably, the substrate is "chemically resistant", i.e., maintains its integrity and does not materially change in the presence of the chemical fluid to be detected. The substrate 15 may also be a clear film, in which case it is possible to provide a colorant on the surface of 15 which does not contact layer 11. Typical thicknesses for the visual indicating layer (13 or 19) are in the range of from about 0.02 mm (0.7 mils) to 0.2 mm (8 mils).

Preferably, as shown in FIG. 1c, layers 11 and 19 are attached to each other by a pressure sensitive adhesive 14. While FIG. 1c illustrates a continuous adhesive layer 14 between layers 11 and 19, it is also possible to provide one or more discontinuous segments or strips of adhesive to adhere layers 11 and 19. For example, two continuous strips of adhesive may be provided on opposite longitudinal edges of layers 11 and 19 to adhere these layers together. Other means may alternatively be used to attach layers 11 and 19. For example, a mechanical means (ex: pins, staples, clamps, jigs, and the like) may be used. Still further, the edges of layers 11 and 19 may be heat sealed to one another if desired.

Before any chemical leak occurs, layer 11 masks or conceals from view the visual indicator. When a chemical leak occurs, the chemical causes layer 11 to become transparent, thereby enabling the visual indicator to become visible and signaling a chemical leak. It is noted that adhesive layer 14 (when present) should not substantially obscure the appearance of the visual indicator, i.e., should not prevent a viewer from seeing at least a portion of the visual indicator when layer 11 becomes transparent. This is typically accomplished by providing a thin (e.g. 0.03 mm (1 mil)), transparent layer of adhesive 14 or applying adhesive 14 on only a small portion of the interface between layers 11 and 13 or 17.

The embodiments of FIGS. 1a, 1b, and 1c are useful for detecting chemical leaks which may occur in a wide variety of articles, such as pipe joints, valves, spigots, and the like. For example, they may be set underneath a valve or spigot in such a manner that the visual indicator is visible in the event of a chemical leak. When a leak occurs, the chemical causes layer 11 to become transparent. This in turn exposes the visual indicator and signals a leak.

Alternatively, the embodiments may be affixed to the article to be monitored for leakage. A particularly useful application is illustrated in FIG. 2 wherein two flanged pipes 21 and 23 are mechanically attached by bolts 29 to provide a pipe joint 27. A gasket 28 resides between flanges 22 and 24. The composite construction 10 is affixed to flanges 22 and 24 of pipe joint 27 by tape strips 26. It is noted that other means (e.g. clamps, straps, wires, bolts, magnets, and the like) may be used in place of tape strips 26. Composite construction 10 is affixed to pipe joint 27 so that layer 11 is visible on the pipe joint 27. The composite construction 10 is typically affixed to the lower portion of pipe joint 27. This is because chemicals tend to be heavier than air, and therefore leakage is most commonly concentrated at the lowest point of the pipe joint.

For the application illustrated in FIG. 2, layer 13 is preferably permeable to the chemical to be detected. The term "permeable" means that the layer allows for the passage of a chemical fluid (gas or liquid) to be detected therethrough. When a leak occurs, chemical fluids travel through layer 13 to reach layer 11. Layer 11 becomes transparent in the presence of the chemical, thereby exposing the visual indicating layer 13. Materials that are not inherently permeable to the chemical(s) to be detected may be hole-punched or otherwise provided with openings or pores that allow the chemical(s) to pass therethrough. For example, a particularly useful material for layer 19 is hole-punched polyester film 15 bearing a layer of colored pigment 17 thereon. Such a material is permeable to a wide variety of chemicals (by virtue of the holes) but also chemical resistant thereto.

FIG. 3 illustrates a view similar to FIG. 2 after a chemical leak has occurred. As shown, after a chemical leak has occurred, layer 11 becomes transparent and exposes the visual indicating layer 13.

The chemicals which may be detected using the composite construction 10 of the present invention vary over a wide range and include, for example, water, tetrahydrofuran, ethylacetate, carbon disulfide, gasoline, kerosene, aromatic chemicals (xylene, toluene, benzene, phenylacetate, benzaldehyde, ethyl benzene, styrene, 1,2,4-trimethylbenzene, 1-methylnaphthalene, and the like), chlorinated solvents (carbon tetrachloride, chloroform, and the like), and ketones (acetone, methyl ethyl ketone, 2-butanone, 2-pentanone, 3-pentanone, 2-hexanone, 3-hexanone, 2-heptanone, and the like), and combinations and solutions thereof. Any chemical can be detected as long as layer 11 becomes transparent in its presence.

Useful optional adhesives 14 for attaching layers 11 and 19 include a wide variety of materials. Preferred adhesives are those that exhibit pressure sensitive adhesive (PSA) properties either inherently or by compounding with commonly known tackifying resins. Examples of such PSA compositions include tackified natural rubbers, tackified block copolymers (e.g., styrene-isoprene-styrene, styrene-butadiene-styrene, and styrene-ethylene-butylene-styrene block copolymers), tackified silicone elastomers, and inherently tacky materials such as poly(acrylates), poly(vinyl esters), and poly(alpha-olefins). The adhesive may be hot melt, water-borne, or solvent-based. Optional adhesive layer 14 may comprise, for example, a coated adhesive layer or an adhesive layer provided by a transfer tape. Layer 14 may also comprise a double-sided tape. Typical thicknesses for adhesive layer 14 are in the range of from about 0.02 mm (0.7 mil) to about 0.1 mm (4 mils).

FIG. 4 illustrates a composite construction 40 similar to FIG. 1c wherein holes 55 have been provided through layers 15, 17, 14, and 11. The holes 55 facilitate the travel of chemical fluids (gas or liquid) through layers 15, 17, and 14 to reach layer 11. The holes 55 may be provided using a wide variety of hole punch methods including manual and automated operations. It is noted that a non-woven or other porous material could be used as layer 15, thereby obviating the need to hole punch this layer.

Composite construction 40 further comprises a transparent cover layer 54. It is noted that holes 55 preferably do not extend through the transparent cover layer 54. The transparent cover layer 54 may be applied around the composite construction 40 and adhered to visual indicating layer 19 by adhesive layers 42. The cover layer 54 is transparent so that it does not obstruct the view of the visual indicator in the event of a chemical leak. The transparent cover layer 54 is preferably impermeable to the chemical(s) to be detected, thereby facilitating the concentration of chemical fluids onto layer 11 and enhancing the sensitivity of the composite construction to chemical leaks. Useful transparent materials for layer 54 include a wide variety of polymeric materials such as polypropylene, polycarbonate, polyurethane, ethylene vinylacetate, ethylene methylacrylate, ethylene ethylacrylate, polyacrylate, polyvinylidene chloride, polyvinyl chloride, polystyrene, polyester, polyethylene, and the like. A particularly preferred transparent polymeric material for layer 54 is polyethylene. Typical thicknesses for layer 54 are in the range of from about 0.02 mm (0.7 mil) to about 0.15 mm (6 mils).

Preferred adhesives for layer 42 are those that exhibit pressure sensitive adhesive properties. Examples include those described hereinabove. Typical thicknesses for adhesive layer 42 are in the range of from about 0.02 mm (0.7 mil) to about 0.1 mm (4 mils).

FIG. 5a illustrates a top view of another composite construction 50 of the present invention. Composite construction 50 comprises an elongated transparent cover layer 54' which extends beyond layers 11 and 19 (not visible) along the x and y axes. It is again noted that the holes 55 preferably do not extend through the transparent cover layer 54'.

FIG. 5b illustrates a cross-sectional perspective view taken along line 5b of FIG. 5a. The transparent cover layer 54' is adhered to layer 11 by adhesive layer 56 which extends along the entire length and width of transparent cover layer 54'. It is noted that adhesive layer 56 should not substantially obscure the appearance of the visual indicator, i.e., should not prevent a viewer from seeing at least a portion of the visual indicator when layer 11 becomes transparent. Another layer of adhesive 57 is present on layer 15. Release liner 59 is releasably attached to adhesive layer 57 and the portions of adhesive layer 56 which extend along the longitudinal edges of transparent cover layer 54'. Composite construction 50 may be attached to an article such as a pipe joint by removing release liner 59 to expose adhesive layer 57 and the portions of adhesive layer 56 which extend along the longitudinal edges of transparent cover layer 54' and applying the exposed adhesive to the article. It is noted that adhesive layer 57 is optional since adhesive layer 56 may be sufficient to attach composite construction 50 to an article. When used to detect leaks on a pipe joint, the length of transparent cover layer 54' is preferably sufficient to encompass the full diameter of the pipe joint. The width of transparent cover layer 54' is preferably sufficient to provide adequate coverage over the interface between the flanges (typically 5-10 cm). FIG. 5c illustrates the embodiment of FIGS. 5a and 5b applied to a pipe joint.

Preferred adhesives for layers 56 and 57 are those that exhibit pressure sensitive adhesive properties. Examples include those described hereinabove. Typical thicknesses for adhesive layers 56 and 57 are in the range of from about 0.02 mm (0.7 mil) to about 0.1 mm (4 mils).

Examples of suitable release liners 59 include paper, coated paper and plastic film substrates which inherently possess adhesive-releasing characteristics and, more commonly, substrates which have been treated with silicone, fluoropolymer, fluorosilicone, or other release coatings. Preferred release materials are silicone coatings comprising polysiloxanes. Such release materials are described, for example, in *Paper, Film & Foil Converter*, 62:57–59 (1988) and the *Journal of the Adhesive and Sealant Council*, 18:11–25 (1989).

FIG. 6 illustrates a composite construction 60 similar to that shown in FIG. 1c but additionally comprising a foam layer 52 adhesively bonded to layer 15 by adhesive layer 61. The foam layer 52 provides a flexible base for the composite construction 60 so that it may be easily wrapped around a non-planar surface, for example, the curved surface of a pipe joint. Useful foam layers 52 include a wide variety of materials such as polyethylene, polypropylene, polystyrene, polyurethane, polyacrylate, polyester, and the like. Preferably, foam layer 52 is chemically resistant. A preferred foam layer comprises polyethylene foam because of its solvent resistance to a wide variety of chemicals (such as acetone, toluene, benzene, ketones, etc.). Typical thicknesses for foam layer 52 are in the range of from about 0.2 mm (8 mils) to about 3 mm (118 mils).

The edges 66 of transparent cover layer 54' are affixed to layer 52. Preferably, edges 66 are heat sealed to layer 52. In this case, it is preferable that layers 54' and 52 comprise materials which can be heat sealed together, for example, polyethylene film and polyethylene foam. Alternatively, edges 66 may be adhesively or mechanically bonded to layer 52.

A layer of adhesive 56 is applied to foam layer 52. Adhesive layer 56 provides a means for attaching the composite construction 60 to an article to be monitored for chemical leakage.

Preferred adhesives for layers 56 and 61 are those that exhibit pressure sensitive adhesive properties. Examples include those described hereinabove. Typical thicknesses for adhesive layers 56 and 61 are in the range of from about 0.02 mm (0.7 mils) to about 0.1 mm (4 mils).

A release liner 59 is releasably attached to adhesive layer 56. Examples of suitable release liners include those described hereinabove. Prior to attachment of the composite construction to an article, release liner 59 is removed.

One embodiment of the present invention is described with reference to FIG. 5b. Cover layer 54' comprises 0.1 mm (4 mils) thick polyethylene film. Layer 11 comprises closed cell polystyrene foam having a thickness in the range of from about 0.6 mm (24 mils) to about 1.5 mm (60 mils). Layer 19 comprises 0.05 mm (2 mils) thick polyester film 15 having a 0.005 mm (0.2 mil) thick bright orange pigment or color 17 printed thereon. Adhesive layer 14 comprises a layer of an acrylate pressure sensitive adhesive having a thickness of from about 0.02mm (0.07 mil) to about 0.07 mm (3 mils). Adhesive layers 56 and 57 comprise layers of acrylate pressure sensitive adhesive having thicknesses in the range of from about 0.05 mm (2 mils) to about 0.13 mm (5 mils). Release liner 59 comprises a silicone-coated paper.

The composite construction 60 may be applied to a pipe joint such as illustrated in FIGS. 2 and 5c. Prior to attachment, the release liner 59 of the composite construction 60 is removed to expose adhesive layer 56. Adhesive layer 56 is then applied to pipe joint 27 to affix the composite construction 60 thereto. Preferably, the composite construction is applied at the lowest point of the pipe joint. A tape may be applied over the remaining interfacial region between the flanges so that it overlaps each end of composite construction 60. The purpose of the tape is to facilitate the concentration of chemical fluids onto composite construction 60 and enhance the sensitivity of the composite construction 60 to chemical leaks. The tape is preferably chemically resistant. The tape may comprise, for example, pressure sensitive adhesive tape comprising a polymeric film backing. Alternatively, the tape may be replaced with a caulk or other type of wrap that seals the interfacial area between the flanges and facilitates the concentration of chemical vapors.

When the pipe joint is located outside, composite construction 60 as well as any tape used therewith is preferably weatherable, i.e., can withstand temperature and humidity fluctuations as well as other climate conditions such as sunlight, rain, snow, ice, hail, and the like.

FIG. 7 further illustrates the appearance of composite construction 60 after a chemical leak has occurred. More specifically, layer 11 has become transparent, exposing the visual indicator 17.

FIG. 8 illustrates another embodiment of the present invention wherein composite construction 80 comprises a cylindrical or tube-like configuration. Other configurations, such as rectangular, pyramidal, and the like, may also be used. The composite construction 80 comprises an inner core 13 comprising a visual indicator that is encased by the outer shell 11. The composite construction can be inserted, for example, between two flanges using an adhesive or mechanical means, and used to detect chemical leakage. The composite construction 80 operates in a similar fashion to those embodiments described above. More specifically, when a chemical leak occurs, outer shell 11 of the tube-like configuration becomes transparent, thereby exposing the visual indicator of inner core 13. This, in turn, signals an observer that a chemical leak has occurred.

FIG. 9 illustrates yet another composite construction 90 of the present invention. Composite construction 90 comprises a visual indicating layer 19' having first and second distal ends, 91 and 92, respectively. A first attachment means 14 is present on the first distal end 91. A second attachment means 114 is present on the second distal end 92. The second attachment means 114 comprises a layer of a material 11 that deteriorates in the presence of a chemical to be detected and a layer of pressure sensitive adhesive 14.

Figure 10A:
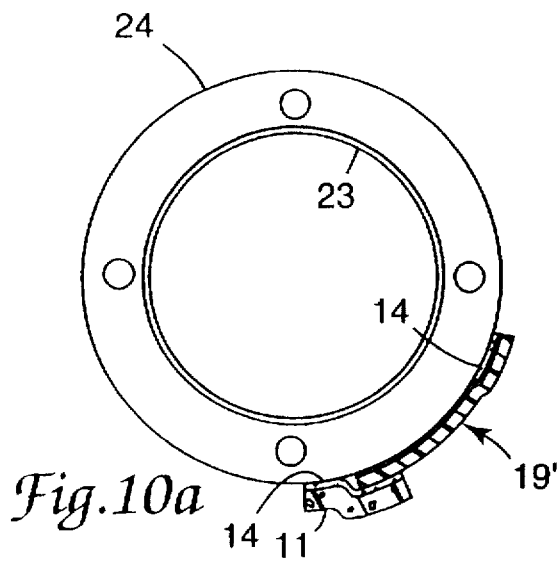
FIGS. 10a and 10b are cross-sectional end views of the embodiment of FIG. 9 applied to a flange before and after a chemical leak has occurred, respectively.
Figure 10B:
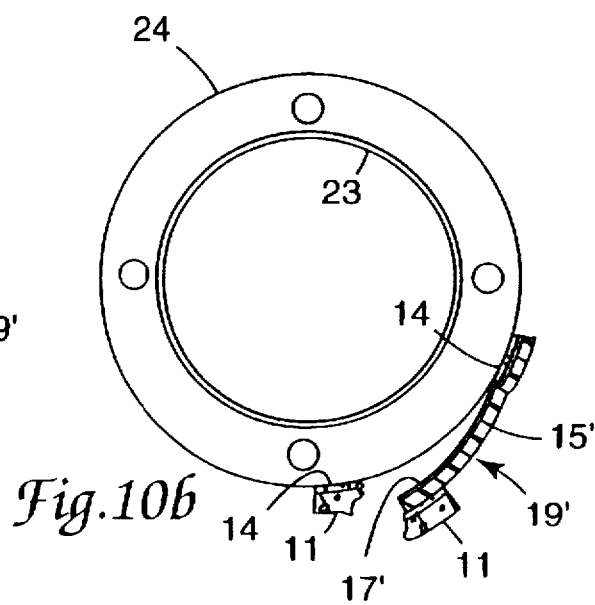

FIGS. 10a and 10b illustrate how the composite construction 90 of FIG. 9 may be used to detect a chemical leak. FIG. 10a shows a cross-sectional end view of the composite construction 90 applied to a pipe joint before a chemical leak has occurred. Adhesive layers 14 were used to affix composite construction 90 to flange 24. The visual indicator 17' of layer 19' is not visible. When a chemical leak occurs, the chemical causes layer 11 to deteriorate. This, in turn, causes a disruption in the composite construction 90, whereupon layer 19' falls away or detaches from flange 24 as shown in FIG. 11b. The visual indicator 17' is now visible, thereby signaling a chemical leak.

Layer 19' preferably comprises a visual indicator 17' provided on a rigid substrate 15' that exerts a recovery force that is sufficient to detach layer 19' from flange 24 when a chemical leak occurs. Suitable materials for substrate 15' include spring steel, polymeric films (such as polyester, polyethylene, Teflon, polyvinylchloride, polystyrene, ethylene vinylacetate, ethylene methylacrylate, ethylene ethylacrylate, polycarbonate, polyurethane, polyacrylate, polyvinylidene chloride, and polypropylene), fabrics, paper, and metal films (such as aluminum foil). Typical thicknesses for substrate 19' are in the range of from about 0.07 mm (3 mils) to about 0.64 mm (25 mils). Preferably, layer 19' is impermeable to the chemical(s) to be detected.

Figure 11:
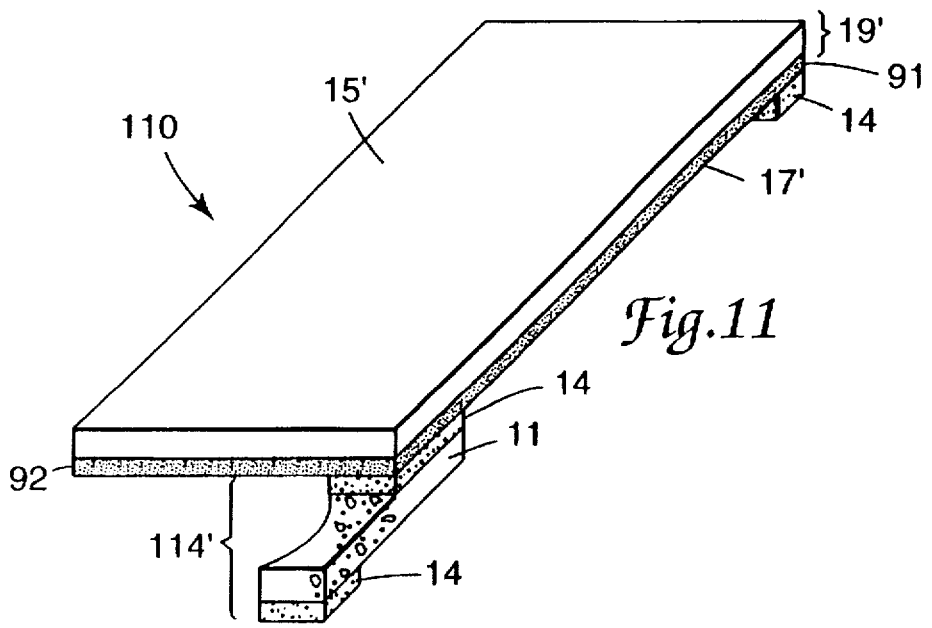
FIG. 11 is a cross-sectional perspective view showing another embodiment of the present invention.

FIG. 11 illustrates a perspective view of another embodiment of the present invention that can be used in a manner similar to that illustrated in FIGS. 10a and 10b. Composite construction 110 comprises a visual indicating layer 19' having first and second distal ends, 91 and 92, respectively. A first attachment means 14 is present on the first distal end 91. A second attachment means 114 is present on the second distal end 92. The second attachment means 114 comprises a layer of a material 11 that deteriorates in the presence of a chemical to be detected. Layer 11 comprises a tapered edge 11e. Adhesive layers 14 are present on opposite major surfaces of layer 11. Adhesive layers 14 may be used to affix composite construction 110 to a pipe joint. Here again, when a chemical leak occurs, layer 11 deteriorates, causing a disruption in composite construction 110. This in turn causes layer 19' to detach from the pipe joint, thereby exposing visual indicator 17' and signaling a chemical leak.

It is noted that substrates 15' of FIGS. 9 and 11 may comprise clear films. In this case, it is possible to provide the visual indicator 17' in such a way that it is visible through one major surface of the substrate 15', but masked from view on the opposite major surface of layer 15' by using an overcoating. This is illustrated in Example 3.

The composite constructions of the present invention are particularly useful for providing continuous chemical leak monitoring of an article such as a pipe joint, valve, or spigot. Because the monitoring is continuous, the composite constructions can detect leakage that is continuous or intermittent. Furthermore, the composite constructions can be viewed from a distance for the appearance of the visual indicator layer, thereby obviating the need to come into close contact with the article to be monitored. In addition, the composite construction is easy to use, and a single composite construction can detect a wide variety of chemical compounds.

These and other aspects of the invention are illustrated by the following examples which should not be viewed as limiting in scope.

EXAMPLES

Example 1

In this example, the ability of various chemicals to dissolve polystyrene foam was determined. Test strips were prepared according to the following procedure:

A 0.004 inch (0.10 mm) thick clear polyester film was sprayed on one side with two light coatings of Krylon ColorWorks FS 940 Orange Fluorescent Spray Paint (commercially available from Krylon, Solon, Ohio). After the paint had dried, a coating of Krylon Industrial Tough Coat™ Acrylic Enamel (1800 Osha White) spray paint was applied over the orange paint such that the orange paint was no longer visible.

A 0.002 inch (0.051 mm) thick acrylic pressure sensitive adhesive transfer tape with a 0.004 inch (0.10 mm) protective paper release liner on one side was laminated to the unpainted side of the polyester film with the adhesive against the film. The protective release liner was then removed and a closed cell polystyrene foam having a density of 6.6 pounds per cubic foot (106 kg/m3) and a thickness of 0.033 inch (0.84 mm) (commercially available from Amoco Foam Products Company, Chippewa Falls, Wis.) was laminated to the exposed adhesive.

One to two drops of the test liquid was placed on the foam and the result was visually obtained. The following liquids were tested: acetone, methyl ethyl ketone, carbon disulfide, toluene, ethylacetate, tetrahydrofuran, xylene, benzene, ethyl benzene, dichloromethane, chloroform, styrene, and unleaded gasoline.

Within several minutes after placement on the polystyrene foam, all the liquids dissolved the polystyrene foam to form a transparent film and reveal the orange color.

Example 2

In this example, a composite construction similar to that shown in FIG. 6 was prepared and tested for its ability to detect vapors.

The composite construction was prepared as follows: First, a test strip according to the procedure of Example 1 was prepared. Next, a second strip of the acrylic pressure sensitive adhesive transfer tape with the protective paper release liner on one side was applied to the white paint of the test strip with the adhesive next to the paint. From this construction, 1 inch (25.4 mm) by 6 inches (152 mm) strips were cut. The protective liner was removed and a 0.0625 inch (1.6 mm) thick by 1.25 inches (31.8 mm) wide by 6.25 inches (158.8 mm) long strip of closed cell polyethylene foam having a density of 4 pounds/cubic foot (64 kg/m3) was bonded to the exposed adhesive. Then a strip of the acrylic pressure sensitive adhesive transfer tape with the protective paper release liner on one side was adhered to the foam. One-fourth inch (6.35 mm) diameter holes were punched down a center line in this construction spaced 1 inch (25.4 mm) apart. A 0.004 inch (0.10 mm) thick by 1.25 inches (31.8 mm) wide by 6.25 inches (158.8 mm) long clear, weatherable polyethylene film was laid over the construction described above so that the polyethylene film was next to the polystyrene foam. The polyethylene film was heat sealed to the polyethylene foam along all edges using a rectangular-shaped tool heated to 300° F. (149° C.).

The composite construction was tested using a test fixture similar to FIG. 2 in the following manner:

Two sections of 4 inch (102 mm) diameter steel pipe with flanged ends were bolted together with a steel fiber gasket. The ends of the pipes were welded tight with fabricated steel end caps. A combination fill port, pressure gauge, and shutoff valve was fitted to one of the pipes. Toluene was added through the fill port until the joined pipes were full. Air pressure at 95 psi (655 kPa) was applied. The bolts were loosened so that a leak of 5000 ppm was created as measured by a organic vapor detecting apparatus (OVA Model 88, commercially available from The Foxboro Company of S. Norwalk, Conn.). The composite construction of the invention was applied to the bottom (lowest point) of the horizontally mounted pipe test fixture described above by removing the protective paper liner, exposing the adhesive layer and pressing the device against the flanges of the joined pipe sections so that the composite construction was parallel to the flanges. The remaining opening between the flanges was sealed with a 2 inch (51 mm) wide section of black polyethylene pressure sensitive adhesive tape.

After about 30 minutes, it was observed that the polystyrene foam layer of the detector construction had dissolved and exposed approximately 5% of the orange colored layer. The solvent vapor level had increased in the sealed area between the flanges to the point that the vapors dissolved the polystyrene foam. Within several hours, approximately 95% of the orange colored layer was exposed.

This test demonstrates the utility of the composite composition of the invention for detecting chemical vapor leaks.

Example 3

In this example, a second type of composite construction similar to that shown in FIG. 11 was prepared and tested for its ability to detect leaks. The composite construction was prepared as follows:

A 1 inch (25.4 mm) wide by 6 inches (152 mm) long by 0.02 inch (0.51 mm) thick clear polycarbonate film was sprayed on one side with two light coatings of Krylon ColorWorks FS 940 Orange Fluorescent Spray Paint (commercially available from Krylon, Solon, Ohio). After the paint had dried, a coating of Krylon Industrial Tough Coat™ Acrylic Enamel (1800 Osha White) spray paint overcoating was sprayed over the orange painted side. The orange color was not visible through the white overcoating, but could be seen through the unpainted side of the clear film.

A 0.045 inch (1.1 mm) thick by 1 inch (25.4 mm) by 1 inch (25.4 mm) square piece of foam tape (Scotch™ Brand VHB™ Tape 4950) was applied to the unpainted surface of one end of the film. To the other end of the film, a 0.25 inch (6.35 mm) by 0.25 inch (6.35 mm) by 0.002 inch (0.051 mm) thick piece of acrylic pressure sensitive adhesive transfer tape with a 0.004 inch (0.10 mm) protective paper release liner on one side was laminated to a corner edge of the unpainted side of the polycarbonate film with the adhesive against the film. The protective release liner of the transfer tape was then removed and one end of a piece of closed cell polystyrene foam having a density of 6.6 pounds per cubic foot (106 kg/m3) and a thickness of 0.033 inch (0.84 mm) (commercially available from Amoco Foam Products Company, Chippewa Falls, Wis.) was adhered to the exposed adhesive. The closed-cell polystyrene foam had dimensions of 0.25 inch (6.35 mm) wide by 0.5 inch (12.7 mm) long with one edge comprising a radius measuring 0.125 inch (3.2 mm) at its narrowest point. A second 0.25 inch (6.35 mm) by 0.25 inch (6.35 mm) by 0.002 inch (0.051 mm) thick piece of acrylic pressure sensitive adhesive transfer tape with a 0.004 inch (0.10 mm) protective paper release liner on one side was laminated to the side of the polystyrene foam opposite the side attached to the polycarbonate film.

The composite construction was tested in the following manner:

A 12 inches (305 mm) long by 3.5 inch (88.9 mm) diameter section of steel pipe, threaded on both ends, was fitted with a steel end cap on one end. The pipe was filled with toluene and sealed with a steel end cap. The composite construction was adhered to the pipe next to a steel end cap with the unpainted layer facing the pipe and the length of the construction parallel the pipe threads. The untapered edge of the closed-cell polystyrene foam was abutted next to the steel end cap. While holding the pipe parallel to the ground and with the attached composite construction on the uppermost point on the pipe, the cap next to the construction was loosened until toluene leaked at the rate of 1 drop/minute. Maintaining the pipe parallel to the ground, the pipe was rotated so that the composite construction was now at the lowest point on the pipe (i.e., facing the ground). The composite construction was almost immediately activated by contact with the leaking toluene, whereby the polystyrene foam deteriorated allowing the painted polycarbonate strip to move away from the pipe. The inner orange painted surface was revealed and thus the leak was detected.

This test demonstrates the utility of the composite composition to detect leaks.

The present invention has now been described with reference to several embodiments thereof It will be apparent to those skilled in the art that many changes can be made in the embodiments described without departing from the scope of the invention. Hence, the scope of the present invention shall not be limited by the structures described herein, but only by structures described by the language of the claims and the equivalents of those structures.

I claim:

1. A composite construction, useful for detecting chemical leaks, comprising:
   (a) a first layer comprising a visual indicator; and
   (b) a second layer comprising a foam, which overlays said first layer to conceal said visual indicator, wherein at least a portion of said second layer becomes transparent in the presence of a chemical to be detected to expose said visual indicator through said transparent portion of said second layer.

2. A composite construction according to claim 1 wherein said first layer is permeable to the chemical to be detected.

3. A composite construction according to claim 1 further comprising a transparent cover layer that is impermeable to the chemical to be detected, wherein said second layer is interposed between said first layer and said transparent cover layer.

4. A composite construction according to claim 1 further comprising a foam layer separate from said second layer comprising a foam, wherein said first layer is interposed between said second layer and said foam layer.

5. A composite construction according to claim 1 further comprising a layer of pressure sensitive adhesive interposed between said first and second layers.

6. A composite construction according to claim 1 comprising a multiplicity of holes extending through said first and second layers.

7. A composite construction according to claim 1 wherein said second layer comprises a closed cell polystyrene foam.

8. A composite construction according to claim 1 wherein said first layer comprises a polyester film bearing a layer of pigment thereon.

9. A composite construction according to claim 3 wherein said transparent cover layer comprises polyethylene.

10. A composite construction according to claim 4 wherein said foam layer, which is separate from said second layer, comprises polyethylene.

11. A method of detecting chemical leaks, comprising the steps of:
   (a) attaching the composite construction of claim 1 to an article to be tested for chemical leaks, and
   (b) monitoring said composite construction for the appearance of said visual indicator.

12. A composite construction, useful for detecting chemical leaks, comprising:
   (a) an inner core comprising a visual indicator, and
   (b) an outer shell comprising a foam that surrounds and conceals said visual indicator, wherein at least a portion of said outer shell becomes transparent in the presence of a chemical to be detected to expose said visual indicator through said transparent portion of said outer shell.

13. A composite construction, useful for detecting chemical leaks, comprising:
   (a) a first layer comprising a visual indicator; and
   (b) a second layer comprising a foam, which overlays said first layer to conceal said visual indicator and which dissolves or deteriorates in the presence of a chemical to be detected such that at least a portion of said second layer becomes transparent to expose said visual indicator through said transparent portion of said second layer.

14. A composite construction according to claim 13 further comprising a transparent cover layer that is impermeable to the chemical to be detected, wherein said second layer is interposed between said first layer and said transparent cover layer.

15. A composite construction according to claim 13 further comprising a foam layer separate from said second layer comprising a foam, wherein said first layer is interposed between said second layer and said foam layer.

16. A composite construction according to claim 13 further comprising a layer of pressure sensitive adhesive interposed between said first and second layers.

17. A method of detecting chemical leaks, comprising the steps of:
   (a) attaching the composite construction of claim 13 to an article to be tested for chemical leaks, and
   (b) monitoring said composite construction for the appearance of said visual indicator.

18. A composite construction, useful for detecting chemical leaks, comprising:
   (a) an inner core comprising a visual indicator, and
   (b) an outer shell comprising a foam that surrounds and conceals said visual indicator but which dissolves or deteriorates in the presence of a chemical to be detected such that at least a portion of said outer shell becomes transparent to expose said visual indicator through said transparent portion of said outer shell.

19. A composite construction, useful for detecting chemical leaks, comprising:
   (a) a first layer comprising a visual indicator; and
   (b) a second layer comprising a closed cell foam, which overlays said first layer to conceal said visual indicator; wherein at least a portion of said second layer becomes transparent in the presence of a chemical to be detected to expose said visual indicator through said transparent portion of said second layer.

20. A method of detecting chemical leaks, comprising the steps of:
   (a) attaching the composite construction of claim 19 to an article to be tested for chemical leaks, and
   (b) monitoring said composite construction for the appearance of said visual indicator.

21. A composite construction, useful for detecting chemical leaks, comprising:
   (a) an inner core comprising a visual indicator, and
   (b) an outer shell comprising a closed cell foam that surrounds and conceals said visual indicator, wherein at least a portion of said outer shell becomes transparent in the presence of a chemical to be detected to expose said visual indicator through said transparent portion of said outer shell.

22. A composite construction, useful for detecting chemical leaks, affixed to a pipe joint, valve, or spigot; said composite construction comprising:
   (a) a first layer comprising a visual indicator, and
   (b) a second layer comprising a foam which conceals said visual indicator, wherein at least a portion of said second layer becomes transparent in the presence of a chemical from the pipe joint, valve, or spigot, to expose said visual indicator through said transparent portion of said second layer.

23. A composite construction, useful for detecting chemical leaks, affixed to a pipe joint, valve, or spigot; said composite construction comprising:
   (a) a first layer comprising a visual indicator, and (b) a second layer comprising a foam which conceals said visual indicator, wherein at least a portion of said second layer dissolves or deteriorates to become transparent in the presence of a chemical from the pipe joint, valve, or spigot, and expose said visual indicator through said transparent portion of said second layer.

* * * * *